June 15, 1965  C. G. HADEK  3,189,322
PERMANENT AUTO JACK
Filed Aug. 21, 1964  7 Sheets-Sheet 1
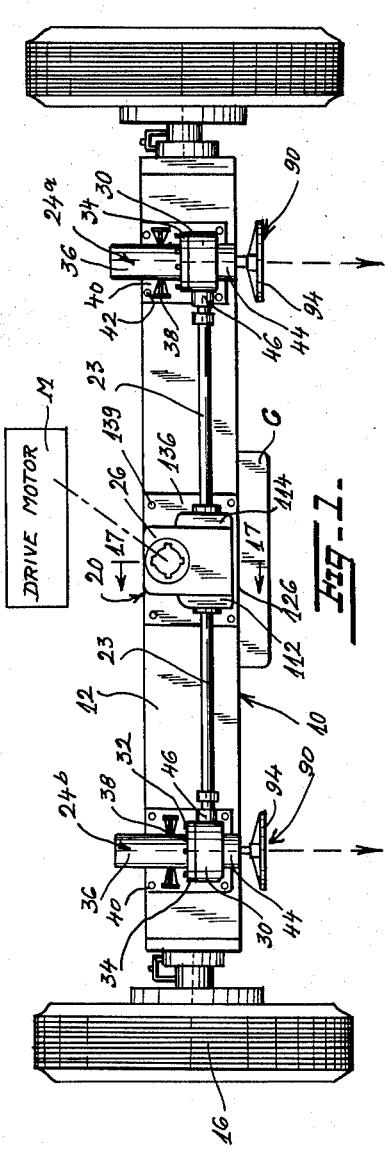
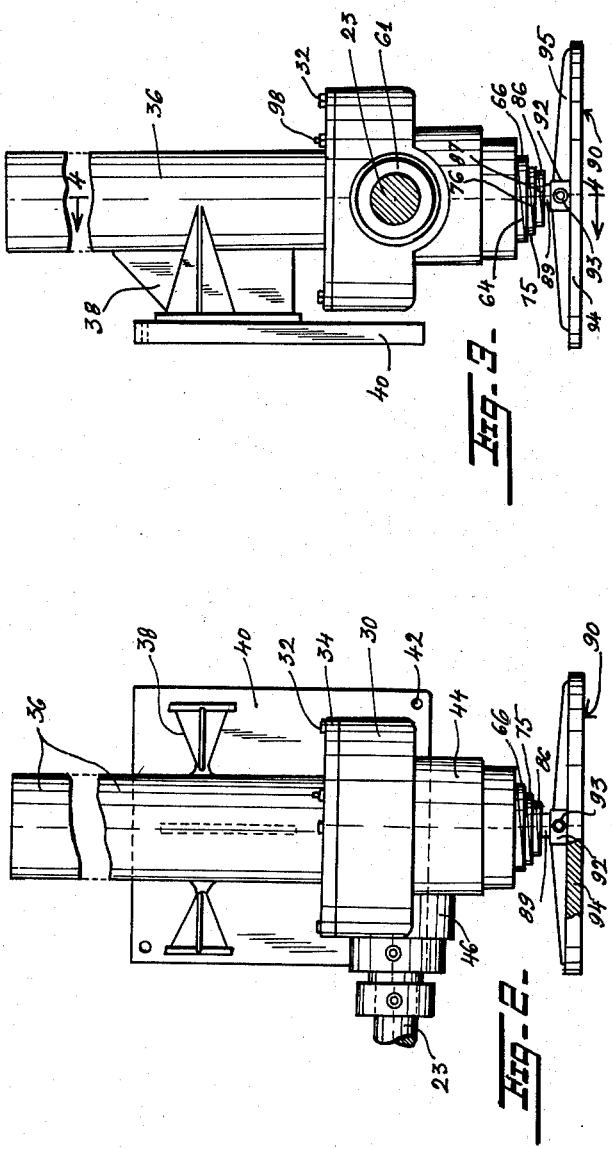
INVENTOR.
Charles G. Hadek
BY Polachek & Saulsbury
ATTORNEYS.

June 15, 1965  C. G. HADEK  3,189,322
PERMANENT AUTO JACK
Filed Aug. 21, 1964  7 Sheets-Sheet 2
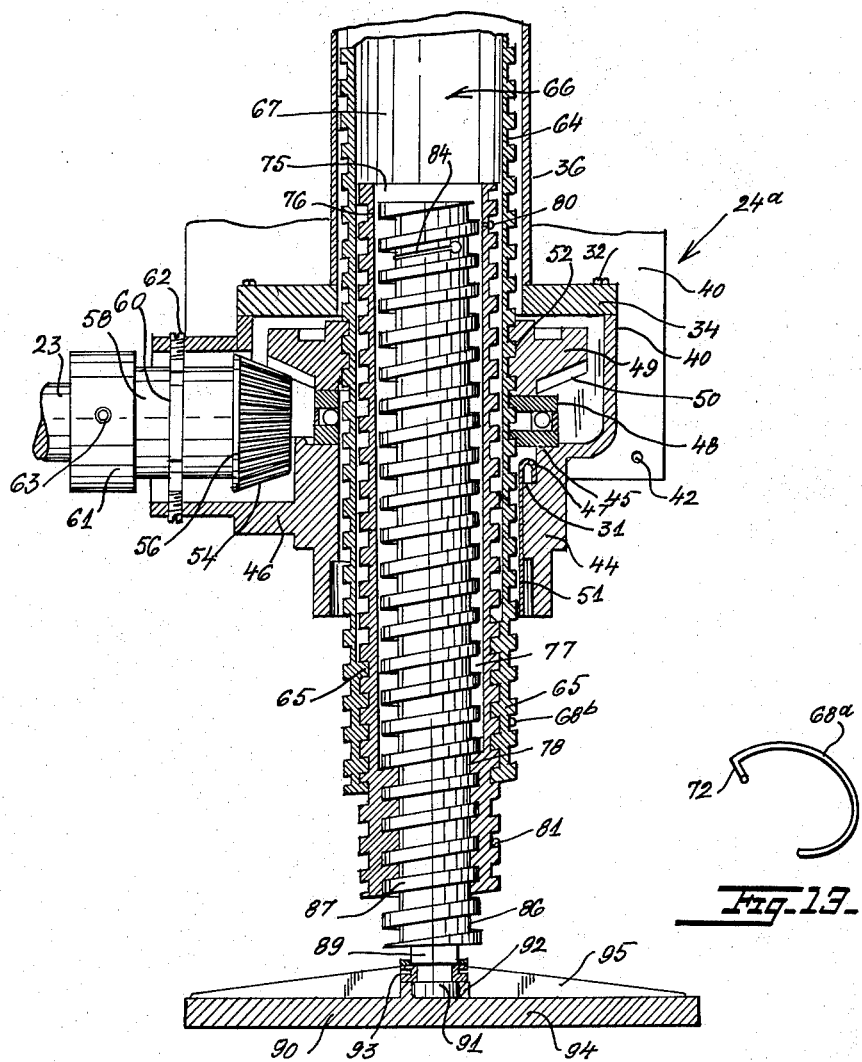
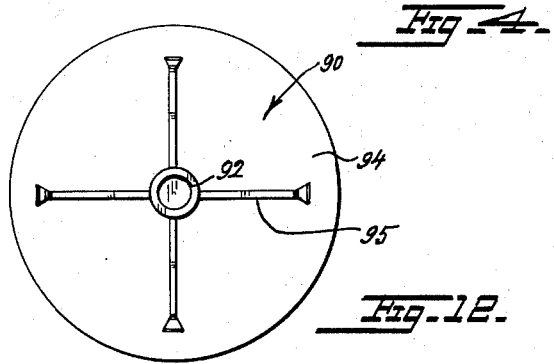
INVENTOR.
Charles G. Hadek
BY
Polachek & Saulsbury
ATTORNEYS.

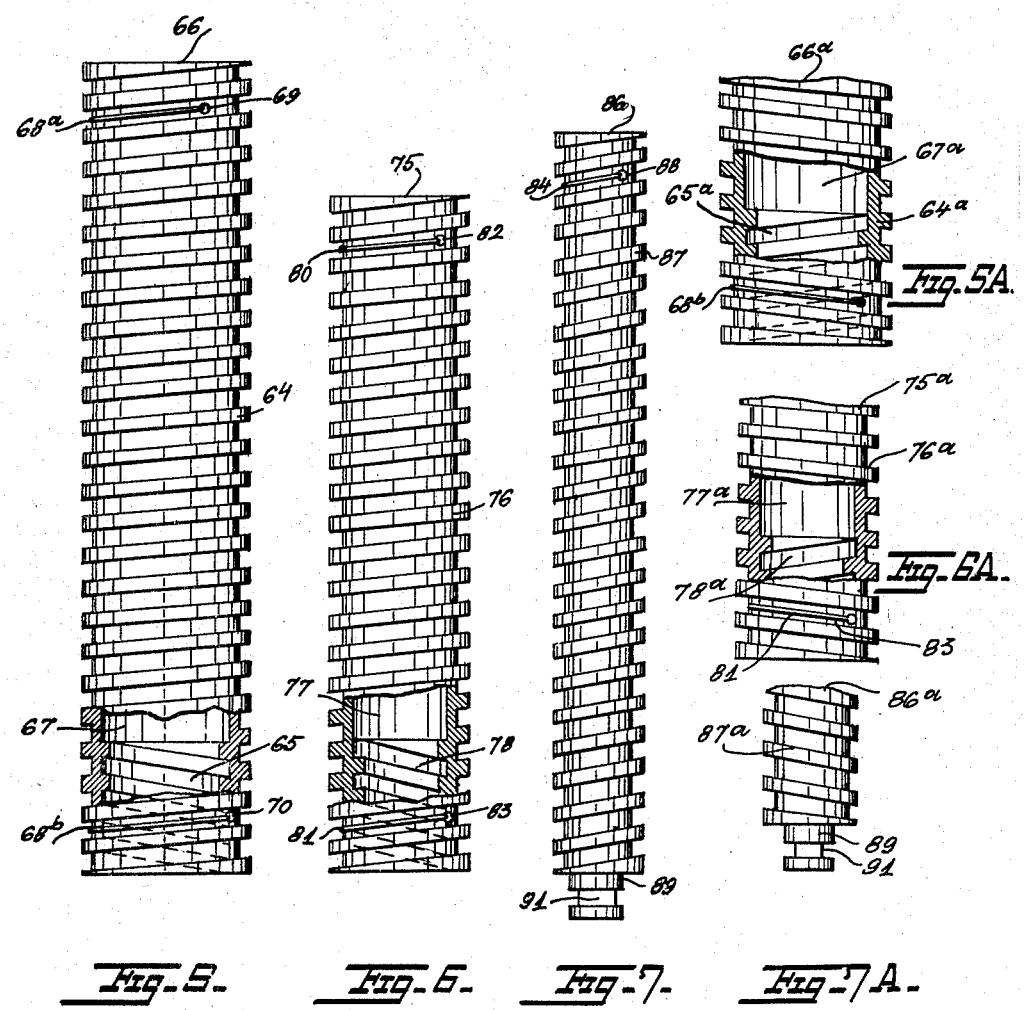

June 15, 1965 C. G. HADEK 3,189,322
PERMANENT AUTO JACK
Filed Aug. 21, 1964 7 Sheets-Sheet 4
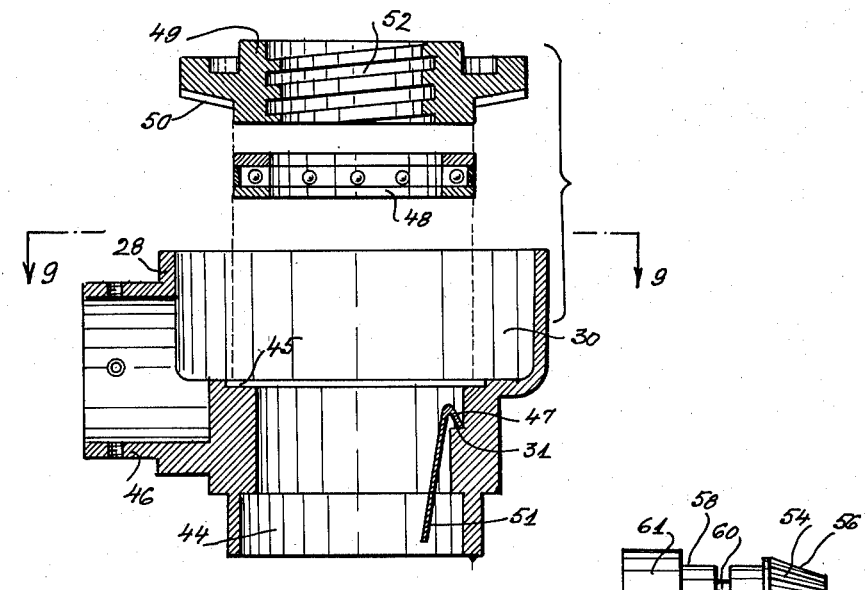
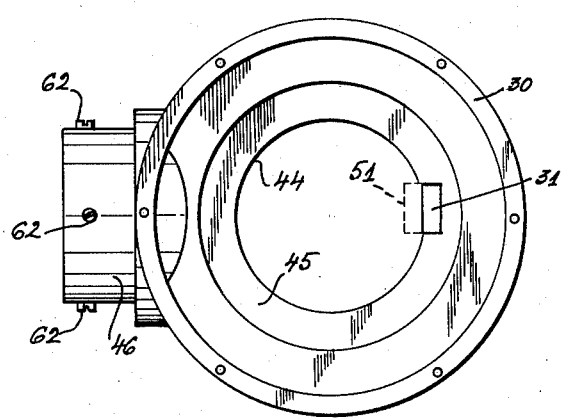
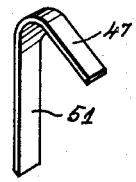
INVENTOR.
Charles G. Hadek

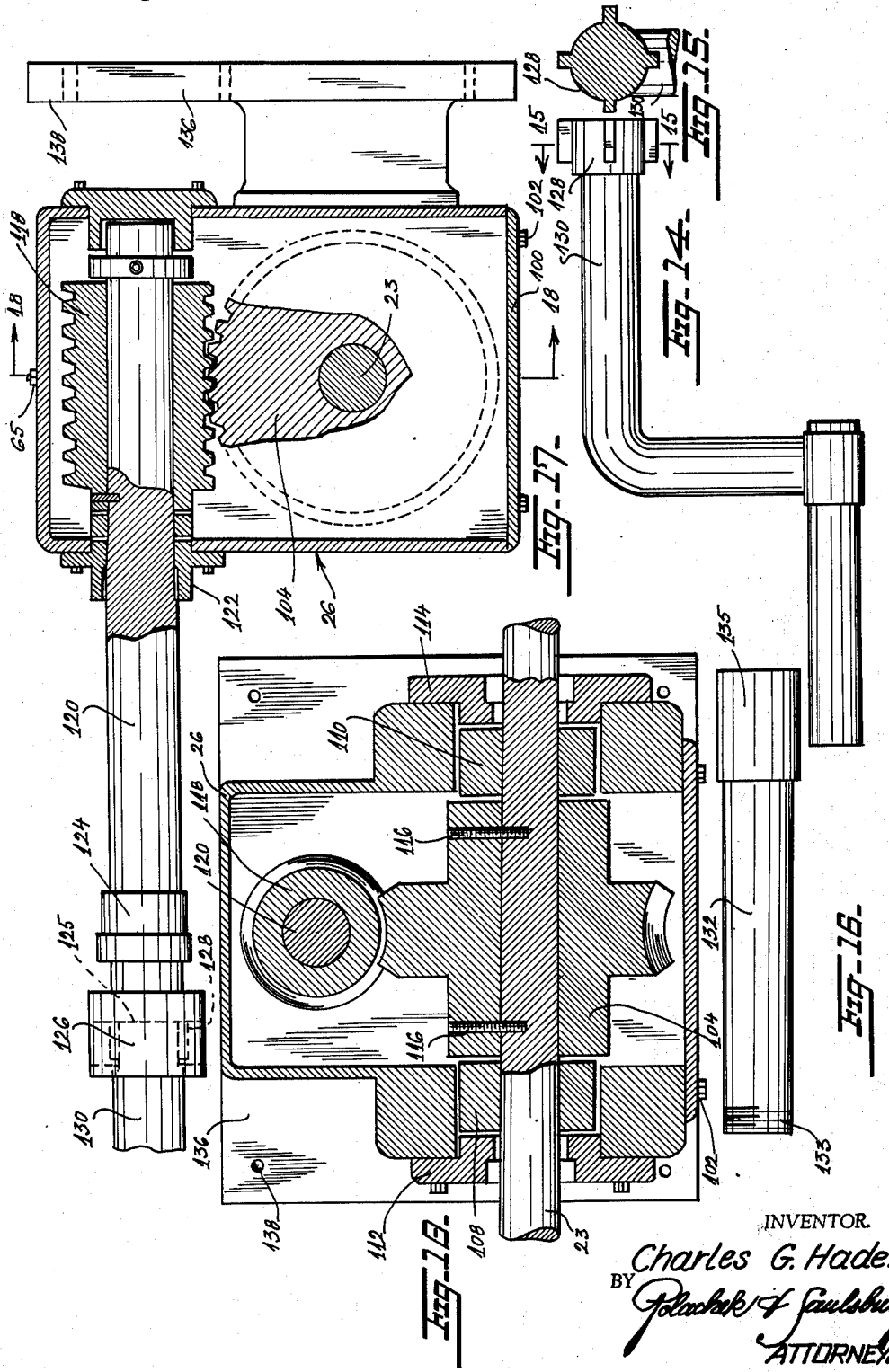

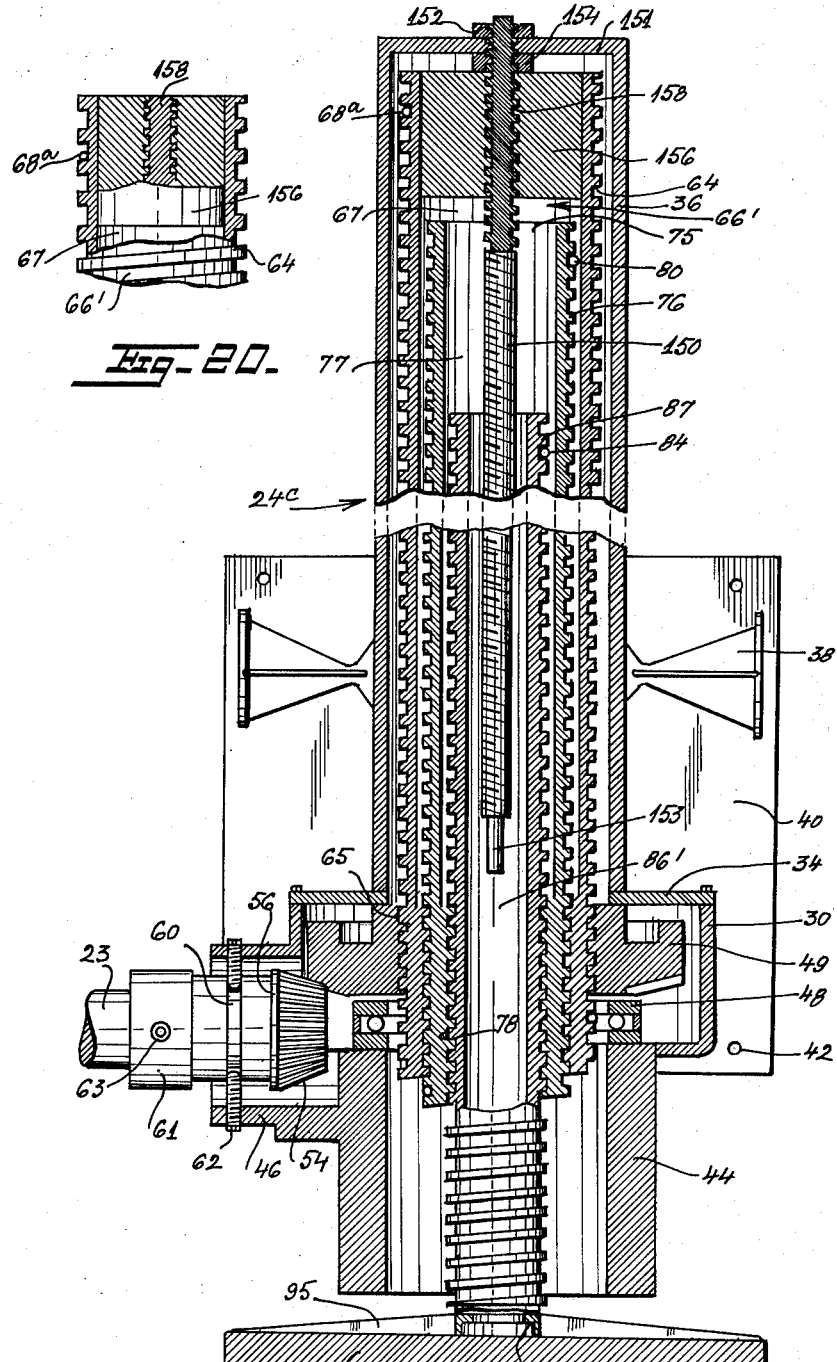

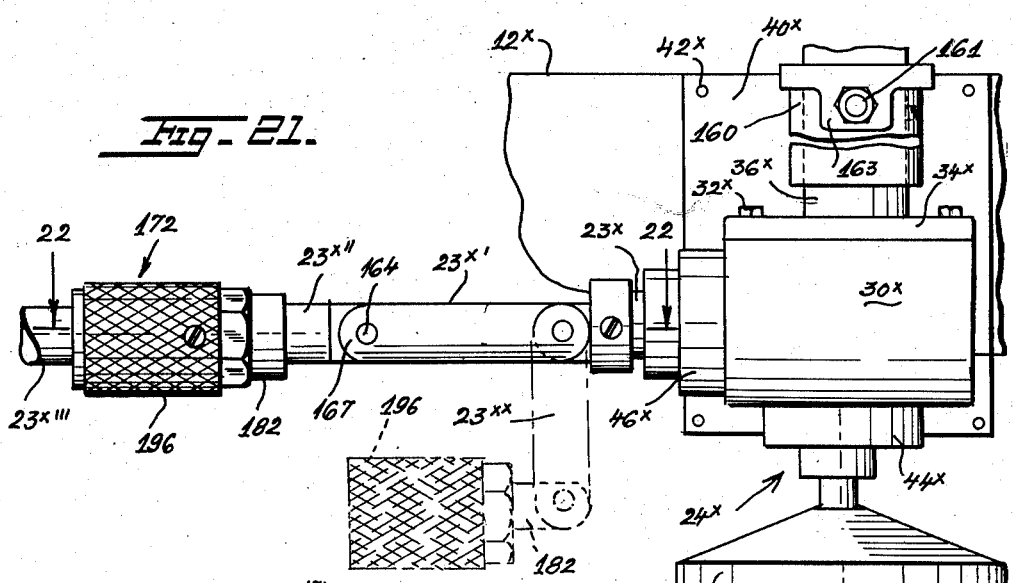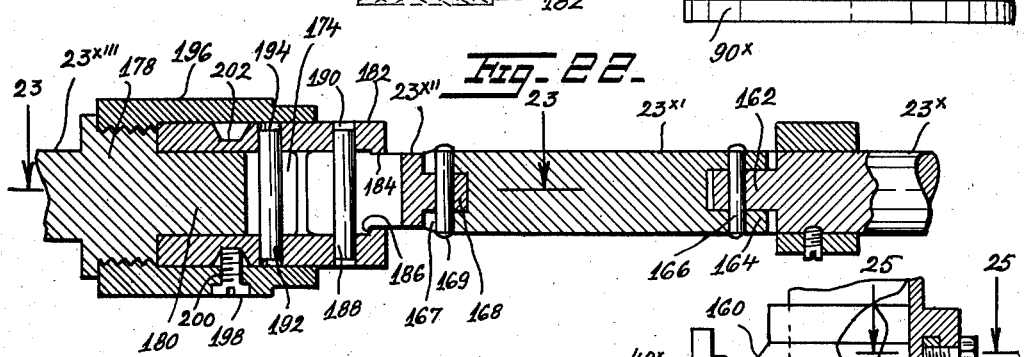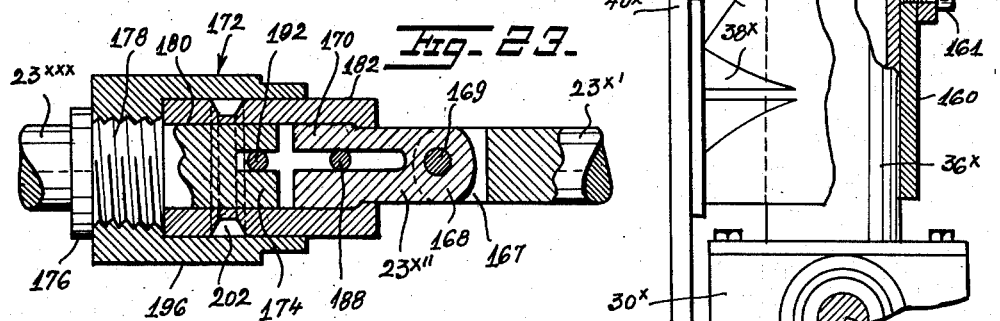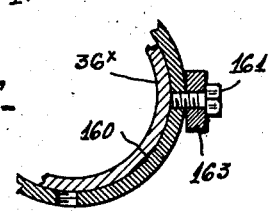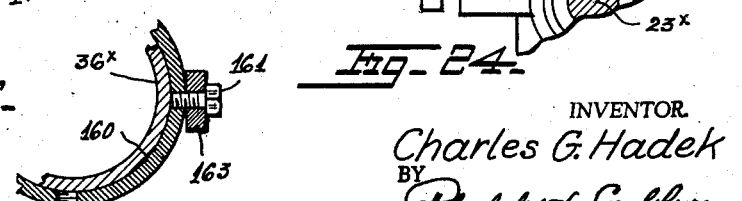

United States Patent Office 3,189,322
Patented June 15, 1965

3,189,322
PERMANENT AUTO JACK
Charles G. Hadek, Oyster Bay, N.Y., assignor of one-half to George Fisanick, Flushing, N.Y.
Filed Aug. 21, 1964, Ser. No. 391,273
13 Claims. (Cl. 254—86)

This application is a continuation-in-part of my application Serial Number 186,253, filed April 9, 1962, now Patent No. 3,149,822. This invention relates to the art of vehicle jacks for lifting and lowering vehicles, and particularly concerns a permanent jack construction for use with automobiles, trucks, and the like.

The invention is intended to relieve some of the difficulties of tire changing. According to the invention there is provided an assembly of jacks which can be permanently mounted on the chassis frame of a vehicle. The assemblies are constructed so that they can be mounted on cross members of the frame at the front and rear of the vehicle. The jack assemblies include mechanisms primarily for hand operation, but also operable by hydraulic or pneumatic means.

It is a principal object of the invention to provide a jack assembly whereby the entire front end and/or rear end of a vehicle can be elevated for changing tires, servicing the underside of a vehicle or other purpose.

A further object is to provide a telescopic jack assembly which in retracted position is carried on a vehicle frame elevated and out of the way.

Another object is to provide a dual assembly of jacks mounted on an end of a chassis frame, both jacks being simultaneously operable.

Another object is to provide a jack unit having three telescopically nested threaded shafts which are advanced and retracted one at a time while a ring gear around the outer one of the shafts is rotated.

A further object is to provide a jack unit as described, with novel means to cause the outer shaft to move axially while the ring gear is rotated.

Still another object of the invention according to a modification thereof is to provide a dual assembly of jacks mounted on an end of a chassis frame, either of which jacks may be separately and individually operated.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a front end elevational view of the chassis frame of a vehicle with a jack assembly embodying the invention mounted thereon.

FIG. 2 is a front elevational view of one unit of a jack assembly shown on an enlarged scale, part being broken away.

FIG. 3 is a side elevational view of the unit of FIG. 2.

FIG. 4 is a sectional view taken on line 4—4 of FIG. 3.

FIGS. 5, 6 and 7 are side elevational views of threaded shafts employed in the jack assembly, lower parts of the shafts in FIGS. 5 and 6 being broken away.

FIGS. 5A, 6A and 7A are fragmentary side elevational views of other threaded shafts employed in the jack assembly, parts of shafts in FIGS. 5A and 6A being broken away.

FIG. 8 is an exploded sectional view of parts of a jack unit.

FIG. 9 is a top plan view of a part of the jack unit, taken on line 9—9 of FIG. 8.

FIG. 10 is a side elevational view of a drive gear employed in the jack unit.

FIG. 11 is a perspective view of a friction spring employed in the jack unit.

FIG. 12 is a top plan view on a reduced scale of a foot plate employed in the jack unit.

FIG. 13 is a perspective view of a spring lock employed to limit extension of a threaded shaft.

FIG. 14 is a side elevational view of a crank, taken on an enlarged scale.

FIG. 15 is a sectional view taken on line 15—15 of FIG. 14.

FIG. 16 is a side view of an extension bar which may be employed in a jack unit.

FIG. 17 is a sectional view on an enlarged scale taken on line 17—17 of FIG. 1, parts being shown in side elevation.

FIG. 18 is a sectional view taken on line 18—18 of FIG. 17, parts being shown in side elevation.

FIG. 19 is a sectional view through a jack unit illustrating a modification of the invention.

FIG. 20 is a fragmentary sectional view of part of a threaded shaft employed in the unit of FIG. 19.

FIG. 21 is a fragmentary front end elevational view of the chassis frame of a vehicle with a part of a jack assembly embodying a still further modified form of the invention.

FIG. 22 is a vertical sectional view through the center of the shafting taken on the line 22—22 of FIG. 21.

FIG. 23 is a sectional view taken on the line 23—23 of FIG. 22.

FIG. 24 is an elevational view of the jack shown in FIG. 21 turned 90 degrees.

FIG. 25 is a sectional view taken on the line 25—25 of FIG. 24.

Referring first to FIG. 1, there is shown a chassis frame 10 of a vehicle having a cross beam 12. Mounted near opposite right and left wheels 14, 16, as viewed in FIG. 1, are jack units 24a and 24b of a jack assembly 20. Disposed between the units is a housing 26 for a gear drive mechanism. The mechanism is operatively connected to the jack units by rotatable drive shafts 23 extending in axial alignment outwardly of opposite sides of the housing.

The jacks units 24a and 24b are substantially identical so that only one jack unit will be explained in detail. It will be understood that at the rear end of the chassis frame 10 an assembly of two other jacks units 24a and 24b can be mounted in the same manner as illustrated in FIG. 1.

Referring now to FIGS. 2–4, there is shown the jack unit 24a including a casing 30 on which is mounted by bolts 32 an annular plate 34. This plate carries an axially vertical tube 36 secured by brackets 38 to a vertical rectangular plate 40. Plate 40 has corner holes 42 which receive bolts 42a for securing the jack unit to the chassis frame.

Casing 30 has a depending cylindrical extension 44 which is axially vertical and a radially extending cylindrical extension 46. On top of extension 44 is a shallow seat 45 on which a cylindrical ball bearing race assembly 48 is disposed. On this bearing assembly is disposed a bevel gear ring 49 having external teeth 50 and an internal helical thread 52. Teeth 50 are engaged with teeth 54 of a miter gear 56. The gear 56 has a hub 58 in which is a circumferential groove 60. Radially extending pins 62 engage in the groove and hold the gear 56 rotatably in casing extension 46. The gear 56 is rotated by a drive shaft 23 secured to gear collar 61 by set screw 63.

The internal thread 52 of gear ring 49 engages external thread 64 of a first elongated hollow cylindrical shaft 66. Shaft 66, as shown to best advantage in FIGS. 4 and 5, is provided with external right-hand thread 64. An internal right-hand thread 65 extends a short distance up from the bottom end of the shaft. The shaft has a smooth bore 67 above thread 65. Springs 68a and 68b are engaged in holes 69, 70 near top and bottom ends of the shaft. Each spring, as clearly shown by spring 68a in FIG. 13, is a circularly curved spring wire member extending slightly more than 180°. One end of the spring has a radially inwardly extending bent hook or tip 72 which enters one of the holes in the shaft and serves to hold the spring on the shaft.

Inside shaft 66 and concentric therewith is another hollow shaft 75; see FIGS. 4 and 6. This shaft has an external right-hand thread 76 engaged with thread 65 of shaft 66. Shaft 75 has an internal right-hand thread 78 at its lower end. The shaft has a smooth bore 77 above thread 78.

Two limit springs 80, 81 are engaged with the shaft near its upper and lower ends. The ends of the springs are engaged in holes 82, 83 in the shaft.

Inside of shaft 75 is another shaft 86; see FIGS. 4 and 7. This shaft is provided with an external right-hand thread 87 which is engaged with internal thread 78. A single limit spring 84 is provided near the top of shaft 86. This lock has its hook end engaged in hole 88. The bottom end 89 of the shaft 86 is formed with a groove 91 which is engaged by set screws 93 in a nipple 92 extending upwardly axially from foot plate 90; see FIG. 12. Foot plate 90 includes a circular base 94 and radially extending ribs 95 for strengthening the foot plate structurally.

Casing 30 has a recess 31 formed in the side of extension 44 diametrically opposite extension 46, as is shown in FIGS. 8 and 9. The hooked end 47 of a leaf spring 51 engages in this recess; see FIG. 11. The spring is biased so that it presses against the threaded outer side of shaft 66 and by frictional engagement prevents the shaft from rotating.

A lubrication fitting 98 (see FIG. 3) may be provided on top of plate 34 communicating with the interior of the casing for applying a suitable lubricant to the parts in the casing without having to disassemble the jack unit.

FIG. 5A shows part of another threaded shaft 66a which is employed in jack unit 24b and corresponds to shaft 66 in jack unit 24a. This shaft is externally threaded with a left-hand thread in contrast to the right-hand thread of shaft 66. The shaft 66a has an internal lower left-hand thread 65a. The shaft has a smooth internal bore 67a like bore 67 in shaft 66.

FIG. 6A shows part of another threaded shaft 75a which is employed in jack unit 24b corresponding to shaft 75 in unit 24a. Shaft 75a has an external left-hand thread 76a and a smooth internal bore 77a terminating at the lower end of the shaft in a left-hand internal thread 78a.

FIG. 7A shows shaft 86a which is employed in jack unit 24b and corresponds to shaft 86 in jack unit 24a. This shaft has an external thread 87a. Other parts corresponding to those of shaft 86 are identically numbered. These three shafts are disposed in concentric coaxial array inside tube 36 of the jack unit, in a manner similar to that illustrated in FIG. 4 for jack unit 24a.

FIGS. 17 and 18 show internal details of the gear housing 26. The housing has a rectangular bottom plate 100 detachably secured by bolts 102. Inside the housing is a worm gear 104 carried on shaft 23. Shaft 23 rotates in radial bearings 108, 110 held inside the housing by side rings 112, 114. Set screws 116 secure the worm gear to the shaft. A worm 118 is carried on a shaft 120 journaled in front and rear bearings 122, 124. The worm engages with the worm gear and rotates the worm gear when the worm is rotated with shaft 120. Shaft 120 is secured by a coupling 125 to a crank socket 126. This socket receives the splined end 128 of a crank 130 shown in FIGS. 14 and 15. If desired, an extension crankshaft 132 shown in FIG. 16 may be provided for insertion between socket 126 and shaft 120. The extension shaft has a threaded end 133 and a threaded socket 135 at the other end to facilitate engagement with coupling 125 and shaft 120. A rectangular plate 136 is secured to the housing and is provided with holes 138 for receiving bolts 139 to support the housing on the chassis frame 12; see FIG. 1.

The jack assembly is operated as follows. Initially the jack units are retracted as shown in FIG. 1, with the jack plates 90 elevated above the bottom of lowermost projecting part C of the chassis frame 10. The crank 130 is engaged in socket 126 by insertion of the crank end 128 therein. If the crank is turned in one direction, the meshed gear 104 and worm 118 will rotate to rotate shaft 23. Shaft 23 rotates the miter gears 56 in the jack units 24a, 24b. The miter gears turn the bevel gears 49. As gears 49 rotate, shafts 66 and 66a are prevented from turning by the springs 51 frictionally engaged thereon. The shafts move axially downward until their upper limit springs 68a engage on the upper ends of gears 49. Thereafter the gears 49 and shafts 66, 66a rotate together. When the shafts 66, 66a are sufficiently lowered, the jack plates 90 are forced against the ground. Continued rotation of the crank results in downward axial movement of shafts 75 and 75a as internally threaded portions 65, 65a of shaft 66, 66a track the external threads 76, 76a. The shafts 75, 75a are stopped by engagement of upper limit springs 80 on the threads 65, 65a. Thereafter, the shafts 66, 75 rotate together and shafts 66a, 75a rotate together. Shafts 86, 86a now move axially downward as threads 78, 78a rotate around the external shaft threads 87, 87a. These shafts are stopped when upper limit springs 84 engage on internal threads 78, 78a.

Since both jack units are simultaneously operated, the whole front end of the vehicle can be raised by rotation of the single crank in one direction. The jack assembly at the rear of the vehicle (not shown) will be operated in the same manner to raise the rear end of the vehicle. By turning the crank in reverse direction the threaded shafts will telescopically retract to the position of FIG. 1.

FIGS. 19 and 20 show jack unit 24c which is similar to jack unit 24a and can replace jack unit 24a in assembly 20. Corresponding parts are identically numbered. In jack unit 24c, a stationary threaded rod 150 is secured to the top 151 of tube 36 by nuts 152, 154. This rod is axially vertical and passes through a cylindrical block 156 internally and axially threaded at 158. The block is secured nonrotatably in the upper end of shaft 66'. Shaft 86' is hollow.

In operation of jack unit 24c, the engagement of threaded rod 150 with the threaded block 156 will permit the shaft 66' to turn and will also cause the shaft 66' to move axially downward as the shaft is turned by bevel gear 49. The shaft 66' will move axially downward until spring 68a engages the top of gear 49. At this position of shaft 66', the block 156 is disengaged from the thread of rod 150 but the lower unthreaded end 153 of rod 150 will be positioned in the threaded bore of the block to serve as a guide for reengagement of the block and threaded rod on reverse upward movement of the shaft. Continued turning together of the gear 49 and shaft 66' causes shafts 75 and 86' to be moved axially downward as above explained. Another jack unit with oppositely threaded shafts and threaded rod will be employed for the other jack unit forming part of the assembly 20.

Instead of employing a manually operable crank, a suitable pneumatically, hydraulically or mechanically driven driving tool or appliance M may be engaged with socket 126 for operating the jack assembly to raise and lower the vehicle, as indicated by motor M in FIG. 1. Alternatively, the motor M may be the engine of the vehicle operatively connected to the crank socket 126 to provide power to operate the jacks.

Referring now to the modification of the invention shown in FIGS. 21 to 25, inclusive, herein a single jack unit 24x is shown at one end of the cross beam 12x, the right hand end as viewed in FIG. 1, it being understood that a similarly constructed jack unit is mounted on the left hand end of the crossbeam, both jack units being similarly operatively connected to the drive motor M.

The jack unit 24x comprises a casing 30x closed at the top by a circular plate 34x fastened to the casing by bolts 32x. A vertically disposed tube 36x is carried by plate 34x.

Casing 30x has a depending cylindrical extension 44x which is axially vertical and has a radially extending cylindrical extension 46x. Inside the casing 30x and the extension 46x there is the gearing and shafting for the lifting operation as shown in FIG. 4 or FIG. 19, the shaft being supported on the foot plate 90x, similar to foot plate 90.

In accordance with this form of the invention, the casing 30x and tube 36x are rotatably mounted in a sleeve 160 secured by brackets 38x to a vertical rectangular plate 40x. The plate is fastened to the chassis frame by means of bolts 42x. The sleeve encircles the tube 36x and a screw 161 extending through a lug 163 on tube 26 prevents accidental movement between the tube and sleeve.

The gearing in the casing 30x is driven by a multiple sectional shaft constituted by sections 23x, 23x', 23x", 23x''', the gearing in the casing being connected to one end of round shaft section 23x. The other end of shaft 23x is reduced and flattened as indicated at 162 and is pivotally connected to the bifurcated end 164 of round shaft section 23x' by means of a pivot pin 166 extending through the bifurcated and flattened ends. The other bifurcated end 167 of shaft section 23x' is connected to the adjacent reduced and flattened end 168 of flat shaft section 23x" by pivot pin 169. The other end of shaft section 23x" is bifurcated as indicated at 170. This bifurcated end is connected to the adjacent end of shaft 23x''' through a coupling device 172. The adjacent end of shaft section 23x' is formed with a bifurcated end 174 and inwardly spaced from said end the shaft end is formed with an annular flange 176 and between the flange and outwardly of the flange the shaft is enlarged and formed with external screw threads 178, the remainder of the shaft end to the bifurcated extremity thereof being smooth, as indicated at 180. A bushing 182 is sleeved around the smooth portion of the end of shaft section 23x" and around the bifurcated end 170 of shaft 23x", the bushing having an inner flange 184 on one end thereof engaging a shoulder 186 on the shaft section 23x" to limit movement of the bushing in one direction. A connecting pin 188 extends through the slot forming the bifurcations of shaft section 23x" and into opposed transverse holes 190 in the bushing 182, whereby movement of the bushing is transmitted to shaft section 23x". Another connecting pin 192 extends through the slot forming the bifurcations of the end of shaft section 23x''' and into opposed holes 194 in the bushing 182 whereby movement of the shaft section 23x''' is transmitted to the bushing 182. An elongated cylindrical nut 196 is threaded around the threaded portion 178 of shaft section 23x''' and extends around the bushing 182. A screw 198 extending through a hole 200 in nut 196 and into an annular groove 202 in bushing 182 prevents accidental relative movement of the nut and bushing.

The jack assembly including the jack unit 24x of FIG. 21 is operated similarly to the jack assembly of FIG. 1, through the sectional shafts comprising shaft sections 23x, 23x', 23x", 23x'''. However, it is permissible to operate each jack unit 24x manually separately, individually and selectively. In order to do this the screw 198 is backed out of groove 202 of the bushing 182 to permit turning movement of the nut 196 whereby the nut, bushing and associated parts are backed off of the bifurcated end of shaft section 23x''' whereupon the nut, bushing, shaft section 23x" and shaft section 23x' are adapted to drop down to the position shown in dash lines in FIG. 21 for use as a manually operated crank 23xx. The casing 30x, tube 36x, foot plate 90x, nut, bushing and shaft section 23x' may be manually turned 90 degrees on a vertical axis in sleeve 160 to provide sufficient clearance away from shaft section 23x''' for rotating the nut 196, bushing 182 and shaft section x' as a crank. Thus shaft 23x is turned which in turn rotates gears 54 and 49 and results in raising one corner of the front end or rear end of the vehicle.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A jack unit for raising and lowering an end portion of a vehicle having a chassis frame, comprising a generally cylindrical casing, means for supporting said casing on one end of the chassis frame, a cylindrical hollow member extending axially upward from the casing, a pair of axially vertical hollow shafts telescopically disposed one within the other in said member, each of said shafts being externally threaded for substantially the full length thereof and being internally threaded for only a part of its length from one end thereof, a ring gear having external teeth and an internal helical thread rotatably disposed in the casing, a miter gear rotatably carried by the casing in mesh with the teeth of said ring gear, the external thread of the outer one of said shafts being engaged with the internal thread of the ring gear, the external thread of the inner shaft being engaged with the internal thread of the outer shaft, a third externally threaded shaft axially disposed inside said inner shaft and engaged with the internal thread of said inner shaft, said third shaft having one end extending vertically outside of the casing, a horizontal base plate secured to said end of the shaft, means for turning said miter gear to extend and retract the shafts axially, a block secured at the upper end of the outer shaft, said block being internally and axially threaded, and an externally threaded rod engaged with the thread in said block, said rod having an upper end secured to said cylindrical member, said third shaft being hollow, said rod extending axially inside the third shaft when the shafts are retracted, said rod serving to guide the outer shaft to rotate and move axially when the ring gear turns around the outer shaft.

2. A jack unit for raising and lowering an end portion of a vehicle having a chassis frame, comprising a generally cylindrical casing, means for supporting said casing on one end of the chassis frame, a cylindrical hollow member extending axially upward from the casing, a pair of axially vertical hollow shafts telescopically disposed one within the other in said member, each of said shafts being externally threaded for substantially the full length thereof and being internally threaded for only a part of its length from one end thereof, a ring gear having external teeth and an internal helical thread rotatably disposed in the casing, a miter gear rotatably carried by the casing in mesh with the teeth of said ring gear, the external thread of the outer one of said shafts being engaged with the internal thread of the ring gear, the external thread of the inner shaft being engaged with the internal thread of the outer shaft, a third externally threaded shaft axially disposed inside said inner shaft and engaged with the internal thread of said inner shaft, said third shaft having one end extending vertically outside of the casing, a horizontal base plate secured to said end of the shaft, means for turning said miter gear to extend and retract the shafts axially, a block secured at the upper end of the outer shaft, said block being internally and axially threaded, an externally threaded rod engaged with the thread in said block, said rod having an upper end secured to said cylindrical member, said third shaft being hollow, said rod extending axially inside the third shaft when the shafts are retracted, said rod serving to guide the outer shaft to rotate and move axially when the ring gear turns around the outer shaft, a worm and worm gear in mesh with each other, a drive shaft connected between the miter gear and worm gear, an another drive shaft connected to the worm for driving the miter gear and ring gear to advance and retract the threaded shafts.

3. A jack assembly for raising and lowering an end of a vehicle having a chassis frame, comprising a pair of jack units and a gear housing, means for securing said units and housing to one end of said frame in horizontally spaced relationship with said housing disposed between the jack units, each of said jack units comprising a generally cylindrical casing, a cylindrical hollow member extending axially upward from the casing, a pair of axially vertical hollow shafts telescopically disposed one within the other in said member, each of said shafts being externally threaded for substantially the full length thereof and being internally threaded for only a part of its length from one end thereof, a ring gear having external teeth and an internal helical thread rotatably disposed in the casing, a miter gear rotatably carried by the casing in mesh with the teeth of said ring gear, the external thread of the outer one of said shafts being engaged with the internal thread of the ring gear, the external thread of the inner shaft being engaged with the internal thread of the outer shaft, a third externally threaded shaft axially disposed inside said inner shaft and engaged with the internal thread of said inner shaft, said third shaft having one end extending vertically outside of the casing, a horizontal base plate secured to said end of the third shaft; a gear mechanism in said gear housing, first drive shaft means connected to said gear mechanism for driving the same by externally applied mechanical power, second drive shaft means connecting the gear mechanism and the miter gear in each jack unit, whereby the shafts in both jack units are simultaneously extended and retracted to raise and lower one end of the vehicle when said first drive shaft is turned in one direction and another direction respectively, a block secured at the upper end of the outer shaft, said block being internally and axially threaded, and an externally threaded rod engaged with the thread in said block, said rod having an upper end secured to said cylindrical memmer, said third shaft being hollow, said rod and extending axially inside the third shaft when the shafts are retracted, said rod serving to guide the outer shaft to rotate and move axially when the ring gear turns around the outer shaft.

4. A jack assembly according to claim 3, further comprising motor means operatively connected to the first drive shaft means for driving the same.

5. A jack assembly for raising and lowering an end of a vehicle having a chassis frame, comprising a pair of jack units and a gear housing, means for securing said units and housing to one end of said frame in horizontally spaced relationship with said housing disposed between the jack units, each of said jack units comprising a generally cylindrical casing, a cylindrical hollow member extending axially upward from the casing, a pair of axially vertical hollow shafts telescopically disposed one within the other in said member, each of said shafts being externally threaded for substantially the full length thereof and being internally threaded for only a part of its length from one end thereof, a ring gear having external teeth and an internal helical thread rotatably disposed in the casing, a miter gear rotatably carried by the casing in mesh with the teeth of said ring gear, the external thread of the outer one of said shafts being engaged with the internal thread of the ring gear, the external thread of the inner shaft being engaged with the internal thread of the outer shaft, a third externally threaded shaft axially disposed inside said inner shaft and engaged with the internal thread of said inner shaft, said third shaft having one end extending vertically outside of the casing, a horizontal base plate secured to said end of the third shaft; a gear mechanism in said gear housing, first drive shaft means connected to said gear mechanism for driving the same by externally applied mechanical power, second drive shaft means connecting the gear mechanism and the miter gear in each jack unit, whereby the shafts in both jack units are simultaneously extended and retracted to raise and lower one end of the vehicle when said first drive shaft is turned in one direction and another direction respectively, and means operatively engaged with the outer shaft of each jack unit to cause the same to move axially while the ring gears rotate around the outer shafts; said second shaft means including two multiple sectioned shafts respectively connected between said gear mechanism and the miter gears in the jack units, each of the multiple sectioned shafts including a plurality of pivotally connected shaft sections and coupling means detachably coupled to said gear mechanism, whereby said plurality of pivotally connected shaft sections can be separated from the gear mechanism and pivoted to define a manually turnable crank, whereby the shafts in either one of the jack units can be extended and retracted independently of the shafts in the other jack unit.

6. A jack assembly according to claim 5, further comprising motor means operatively connected to the first drive shaft means for driving the same.

7. A jack assembly for raising and lowering an end portion of a vehicle having a chassis frame, comprising a pair of jack units and a gear housing, means for securing said units and housing to one end of said frame in horizontally spaced relationship with said housing disposed between the jack units, each of said jack units comprising a generally cylindrical casing, a cylindrical hollow member extending axially upward from the casing, a pair of axially vertical hollow shafts telescopically disposed one within the other in said member, each of said shafts being externally threaded for substantially the full length thereof and being internally threaded for only a part of its length from one end thereof, a ring gear having external teeth and an internal helical thread rotatably disposed in the casing, a miter gear rotatably carried by the casing in mesh with the teeth of said ring gear, the external thread of the outer one of said shafts being engaged with the internal thread of the ring gear, the external thread of the inner shaft being engaged with the internal thread of the outer shaft, a third externally threaded shaft axially disposed inside said inner shaft and engaged with the internal thread of said inner shaft, said third shaft having one end extending vertically outside of the casing, and a horizontal base plate secured to said end of the third shaft; a gear mechanism in said gear housing, a crankshaft connected to said gear mechanism for driving the same by externally applied mechanical power, and drive shaft means connecting the gear mechanism and the miter gear in each jack unit, whereby the shafts in both jack units are simultaneously extended and retracted to raise and lower one end of the vehicle when said crankshaft is turned in one direction and another direction respectively, a depending cylindrical extension on said casing, said extension having a recess formed therein, and a leaf spring in said recess frictionally engaging the outer one of said shafts to prevent turning of the same while the ring gear is turning to move said outer shaft axially, means for dividing said drive shaft means into shaft sections pivotally connected to each other for use as a crank, and means for manually rotating the casing and associated parts as a unit to provide space for turning said crank.

8. A jack assembly for raising and lowering an end of a vehicle having a chassis frame, comprising a pair of jack units and a gear housing, means for securing said units and housing to one end of said frame in horizontally spaced relationship with said housing disposed between the jack units, each of said jack units comprising a generally cylindrical casing, a cylindrical hollow member extending axially upward from the casing, a pair of axially vertical hollow shafts telescopically disposed one within the other in said member, each of said shafts being externally threaded for substantially the full length thereof and being internally threaded for only a part of its length from one end thereof, a ring gear having external teeth and an internal helical thread rotatably disposed in the casing, a miter gear rotatably carried by the casing in mesh with the teeth of said ring gear, the external thread of the outer one of said shafts being engaged with the internal thread of the ring gear, the external thread of the inner shaft being engaged with the internal thread of the outer shaft, a third externally threaded shaft axially disposed inside said inner shaft and engaged with the internal thread of said inner shaft, said third shaft having one end extending vertically outside of the casing, and a horizontal base plate secured to said end of the third shaft; a gear mechanism in said gear housing, a crankshaft connected to said gear mechanism for driving the same by externally applied mechanical power, drive shaft means connecting the gear mechanism and the miter gear in each jack unit, whereby the shafts in both jack units are simultaneously extended and retracted to raise and lower one end of the vehicle when said crankshaft is turned in one direction and another direction respectively, said gear mechanism including a worm and worm gear in mesh with each other, said drive shaft means being connected to the worm gear, said crankshaft being connected to the worm gear, a depending cylindrical extension on said casing, said extension having a recess formed therein, and a leaf spring in said recess frictionally engaging the outer one of said shafts to prevent turning of the same while the ring gear is turning to move said outer shaft axially, means for dividing said shaft into sections pivotally connected to each other, and means for rotating the casing and associated parts as a unit.

9. A jack assembly for raising and lowering an end portion of a vehicle having a chassis frame, comprising a pair of jack units and a gear housing, means for securing said units and housing to one end of said frame in horizontally spaced relationship with said housing disposed between the jack units, each of said jack units comprising a generally cylindrical casing, a cylindrical hollow member extending axially upward from the casings, a pair of axially vertical hollow shafts telescopically disposed one within the other in said member, each of said shafts being externally threaded for substantially the full length thereof and being internally threaded for only a part of its length from one end thereof, a ring gear having external teeth and an internal helical thread rotatably disposed in the casing, a miter gear rotatably carried by the casing in mesh with the teeth of said ring gear, the external thread of the outer one of said shafts being engaged with the internal thread of the ring gear, the external thread of the inner shaft being engaged with the internal thread of the outer shaft, a third externally threaded shaft axially disposed inside said inner shaft and engaged with the internal thread of said inner shaft, said third shaft having one end extending vertically outside of the casing, and a horizontal base plate secured to said end of the third shaft; a gear mechanism in said gear housing, a crankshaft connected to said gear mechanism for driving the same by externally applied mechanical power, and drive shaft means connecting the gear mechanism and the miter gear in each jack unit, whereby the shafts in both jack units are simultaneously extended and retracted to raise and lower one end of the vehicle when said crankshaft is turned in one direction and another direction respectively, a depending cylindrical extension on said casing, said extension having a recess formed therein, and a leaf spring in said recess frictionally engaging the outer one of said shafts to prevent turning of the same while the ring gear is turning to move said outer shaft axially, further means for dividing said drive shaft means into shaft sections pivotally connected to each other, and means for rotating the casing and associated parts as a unit, said further means including a coupling device interposed between two adjacent shaft sections, a bushing slidably sleeved around adjacent ends of said two adjacent shaft sections, and a nut coacting with the end of said bushing for sliding the coupling device from the adjacent end of one of said shaft sections whereby said coupling device is swingable away from the adjacent end of the one shaft section so that the other shaft section can be turned as a crank to rotate said third shaft thereby raising and lowering one corner of one end of the vehicle.

10. A jack assembly for raising and lowering an end of a vehicle having a chassis frame, comprising a pair of jack units and a gear housing, means for securing said units and housing to one end of said frame in horizontally spaced relationship with said housing disposed between the jack units, each of said jack units comprising a generally cylindrical casing, a cylindrical hollow member extending axially upward from the casing, a pair of axially vertical hollow shafts telescopically disposed one within the other in said member, each of said shafts being externally threaded for substantially the full length thereof and being internally threaded for only a part of its length from one end thereof, a ring gear having external teeth and an internal helical thread rotatably disposed in the casing, a miter gear rotatably carried by the casing in mesh with the teeth of said ring gear, the external thread of the outer one of said shafts being engaged with the internal thread of the ring gear, the external thread of the inner shaft being engaged with the internal thread of the outer shaft, a third externally threaded shaft axially disposed inside said inner shaft and engaged with the internal thread of said inner shaft, said third shaft having one end extending vertically outside of the casing, and a horizontal base plate secured to said end of the third shaft; a gear mechanism in said gear housing, a crankshaft connected to said gear mechanism for driving the same by externally applied mechanical power, drive shaft means connecting the gear mechanism and the miter gear in each jack unit, whereby the shafts in both jack units are simultaneously extended and retracted to raise and lower one end of the vehicle when said crankshaft is turned in one direction and another direction respectively, said gear mechanism including a worm and worm gear in mesh with each other, said drive shaft means being connected to the worm gear, said crankshaft being connected to the worm gear, a depending cylindrical extension on said casing, said extension having a recess formed therein, and a leaf spring in said recess frictionally engaging the outer one of said shafts to prevent turning of the same while the ring gear is turning to move said outer shaft axially, further means for dividing said drive shaft means into shaft sections pivotally connected to each other, and said further means including a coupling device interposed between two adjacent shaft sections, a bushing slidably sleeved around adjacent ends of said two adjacent shafts and a nut coacting with the end of said bushing sliding the coupling device from the adjacent end of one of said shaft ends whereby said coupling device is swingable away from the adjacent end of the one shaft section and adapted to manually rotate the said third shaft thereby raising and lowering one corner of one end of the vehicle.

11. A jack assembly according to claim 3, wherein the second shaft means includes two multiple sectioned shafts respectively connected between said gear mechanism and the miter gears in the jack units, each of the multiple sectioned shafts including a plurality of pivotally connected shaft sections and coupling means detachably coupled to said gear mechanism, whereby said plurality of pivotally connected shaft sections can be separated from the gear mechanism and pivoted to define a manually turnable crank, whereby the shafts in either one of the jack units can be extended and retracted independently of the other shafts in the other jack unit.

12. A jack assembly according to claim 11, further comprising means rotatably attaching the casings of the jack units to the chassis frame so that the casing of either jack unit can be turned manually on its axis to provide space for turning said pivoted shaft sections as a crank.

13. A jack assembly according to claim 5, further comprising means rotatably attaching the casings of the jack units to the chassis frame so that the casing of either jack unit can be turned manually on its axis to provide space for turning said pivoted shaft sections as a crank.

References Cited by the Examiner
UNITED STATES PATENTS

| | | | |
|---|---|---|---|
| 1,741,793 | 12/29 | Runyan | 254—102 |
| 1,763,144 | 6/30 | Fuller. | |
| 1,811,629 | 6/31 | Hatt. | |
| 1,925,161 | 9/33 | William | 254—86 |
| 2,054,025 | 9/36 | Snell | 254—102 |
| 2,153,530 | 4/39 | Trinkler | 254—86 |
| 2,183,367 | 12/39 | Fow | 254—86 |
| 2,241,877 | 5/41 | Contrino et al. | 254—86 |
| 2,277,908 | 3/42 | Hess et al. | 254—86 |
| 2,347,921 | 5/44 | Miller | 254—86 |
| 2,523,962 | 9/50 | Mahaffey et al. | 254—86 |
| 2,575,659 | 11/51 | Ensey et al. | |

WILLIAM FELDMAN, *Primary Examiner.*

MILTON S. MEHR, *Examiner.*